US008510756B1

(12) United States Patent
Koryakin et al.

(10) Patent No.: US 8,510,756 B1
(45) Date of Patent: Aug. 13, 2013

(54) GUEST OPERATING SYSTEM CODE OPTIMIZATION FOR VIRTUAL MACHINE

(75) Inventors: Alexey B. Koryakin, Moscow (RU); Maxim A. Kuzkin, Moscow (RU); Nikolay N. Dobrovolskiy, Moscow (RU); Andrey A. Omelyanchuk, Moscow (RU); Alexander G. Tormasov, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 1372 days.

(21) Appl. No.: 11/951,934

(22) Filed: Dec. 6, 2007

(51) Int. Cl.
*G06F 3/00* (2006.01)
*G06F 9/455* (2006.01)

(52) U.S. Cl.
USPC .............................. 719/318; 719/319; 718/1

(58) Field of Classification Search
None
See application file for complete search history.

(56) References Cited

U.S. PATENT DOCUMENTS

| | | | |
|---|---|---|---|
| 6,195,676 B1* | 2/2001 | Spix et al. ..................... | 718/107 |
| 2004/0003323 A1* | 1/2004 | Bennett et al. ................. | 714/36 |
| 2004/0003324 A1* | 1/2004 | Uhlig et al. .................... | 714/38 |
| 2006/0233367 A1* | 10/2006 | Birrell et al. .................. | 380/210 |
| 2007/0067366 A1* | 3/2007 | Landis .......................... | 707/205 |
| 2007/0169024 A1* | 7/2007 | Drepper ........................ | 717/139 |
| 2008/0282241 A1* | 11/2008 | Dong ............................. | 718/1 |
| 2009/0037936 A1* | 2/2009 | Serebrin ....................... | 719/318 |
| 2009/0265709 A1* | 10/2009 | Bennett et al. ................ | 718/1 |

OTHER PUBLICATIONS

"Practical Taint-Based Protection using Demand Emulation", Alex Ho, 2006, pp. 1-13.*

* cited by examiner

*Primary Examiner* — Andy Ho
*Assistant Examiner* — Tuan Dao
(74) *Attorney, Agent, or Firm* — Bardmesser Law Group

(57) ABSTRACT

A system, method and computer program product for increasing efficiency of Guest OS code in a Virtual Machine, including installing a driver (Guest Tool) in the Virtual Machine; upon detection of an event in the Virtual Machine that could require a context switch to a Virtual Machine Monitor (VMM), intercepting the event; analyzing the event for whether the event can be handled in the VM and without a context switch; for those events that can be handled natively in the VM, replacing selected instructions with other instructions that accomplish the same task but do not require a context switch; for those events that cannot be handled natively in the VM, transferring control to the VMM; handling the event in the VMM; and returning control to the VM.

13 Claims, 10 Drawing Sheets

GUEST OPERATING SYSTEM CODE OPTIMIZATION FOR VIRTUAL MACHINE

CROSS-REFERENCE TO RELATED APPLICATIONS

This application is related to U.S. Provisional Patent Application No. 60/714,847, filed on Sep. 8, 2005, entitled FAST STUB TECHNOLOGY FOR VIRTUAL MACHINE OPTIMIZATION, and to U.S. patent application Ser. No. 11/530,080, entitled FAST STUB AND FRAME TECHNOLOGY FOR VIRTUAL MACHINE OPTIMIZATION, filed 8 Sep. 2006, which are incorporated by reference herein in their entirety.

BACKGROUND OF THE INVENTION

1. Field of the Invention

The present invention relates generally to Virtual Machine (VM) technology and, more particularly, to methods and systems for optimization of VM guest code.

2. Background Art

With VM technology, a user can create and run multiple operating environments on a computer at the same time. Each operating environment, or Virtual Machine, requires its own operating system (OS) and can run applications independently. The VM software provides a layer between the hardware of the computing system and the software that runs on it.

Frequently, the problem arises of simultaneously running different operating systems on the same hardware system. For example, with one version of MICROSOFT WINDOWS running on the computing system, it can be necessary to start another instance or another version of WINDOWS or another operating system, on the same hardware system.

A typical Virtual Machine Monitor (VMM) enables a single physical machine or processor to act as if it were several physical machines. A VMM, typically jointly with a high-ranking OS (although there are VMMs that can be executed on bare hardware, without a high-ranking OS), can run a number of different operating systems simultaneously, such that each of the different operating systems has its own VM. In other words, a typical VMM can handle a number of VMs, each of which represents its own OS, and each of which can run its own application software and control or use its own hardware, including certain types of processors, I/O and data storage devices, and so on, as if they were running on a single processor. The high-ranking OS is typically referred to as a "host OS" (HOS), or a "Primary OS." The multiple operating systems that are running as VMs are typically referred to as "guest operating systems" ("guest OSs") running "guest code."

A conventional approach for implementing VMs includes a VMM approach developed by IBM and implemented on mainframes, which support virtualization. Another approach includes implementing VMM on modern processors, which do not support the hardware virtualization, such as full step-by-step or page-by-page interpretation of the original code, or full binary translation of the original code, or combining binary translation of some portions of the original code and direct execution of other portions of the original code.

One of the common problems in Virtual Machine technology is the overhead that results from processing of privileged but unsafe instructions, also known as processing of "code under control." In particular, in the context of many Virtual Machine implementations, such as, for example, described in U.S. patent application Ser. No. 11/139,787, entitled METHODS AND SYSTEMS FOR SAFE EXECUTION OF GUEST CODE IN VIRTUAL MACHINE CONTEXT, filed on May 31, 2005, which is incorporated herein by reference in its entirety, the high cost of the exceptions needed to handle the privileged but unsafe instructions is of particular concern. In other words, triggering, or raising, the exceptions is one of the major sources of overhead.

In reality, the number of instructions that are actually privileged but unsafe is relatively low. A significant percentage of overhead relates to handling of jumps within the code, where it is necessary to ensure that the execution of the code does not start executing in an area of memory, or in a page in memory, where it is not supposed to be. Thus, exceptions are normally needed to handle such transfers of control, where the exception is used to analyze the destination address to which control is transferred, and also to process any related activities, such as analysis of the code at the destination address, etc. The control transfers can be handled by placing an INT3 interrupt, instead of the JMP instruction (or some similar instruction), to switch the context to the Virtual Machine Monitor (VMM), where the JMP instruction is then handled or emulated. The JMP instruction itself normally has a ring 3 level of privilege (using the INTEL architecture terminology), if it is part of the guest code. The JMP instruction is therefore replaced by an INT3 interrupt, which changes the context from the guest code/VM context (ring 3) to the VMM context, which is at ring 0. Upon the raising of the exception with INT3, the VMM loads its own register flags (which is inherently part of the context switching), and then proceeds to analyze the jump instruction to determine just what exactly needs to be done to handle this situation.

The handling of the JMP instruction can involve the decoding of instruction, emulation of the instruction and then subsequently switching the context back to the VM and guest code. This entire process, in the Pentium IV architecture takes approximately 4,000 clock cycles.

The JMP instruction itself, in the native mode, can take on the order of 10-30 clock cycles to execute (depending on the processor, processor model, and the type of the JMP instruction). In other words, processing JMP instructions by treating them as privileged but unsafe instructions is approximately two orders of magnitude more costly compared to executing them in a native mode using direct execution. Xen provides a common HVM (hardware virtual machine) abstraction to hide the minor differences between the Intel and AMD technologies and their implementations. HVM offers two features: First, for unmodified guest operating systems, it avoids the need to trap and emulate privileged instructions in the operating system, by enabling guest OSs to run at their native privilege levels, while providing a hardware vector (called "VM EXIT") into the Virtual Machine Monitor whenever the guest OS executes a privileged instruction that can unsafely modify the machine state. The hardware takes more than 1000-4000 CPU clock cycles to save the state of the currently executing guest OS and to transition into the VMM or Hypervisor. This sometimes lead to loss of performance comparing to execution code in the VM.

Accordingly, there is a need in the art for efficient execution of transfers of control in the guest code in a VM context.

BRIEF SUMMARY OF THE INVENTION

The present invention is directed to methods and systems optimizing Guest OS code inside a Virtual Machine that substantially obviates one or more of the problems and disadvantages of the related art.

In one embodiment, a method, system and computer program product increasing efficiency of Guest OS code in a Virtual Machine, including installing a driver (Guest Tool) in the Virtual Machine; upon detection of an event in the Virtual Machine that could require a context switch to exit Virtual Machine context, e.g., to a Virtual Machine Monitor (VMM) or Hypervisor, intercepting the event; analyzing the event for whether the event can be handled in the VM and without a context switch; for those events that can be handled natively in the VM, replacing selected instructions with other instructions that accomplish the same task but do not require a context switch; for those events that cannot be handled natively in the VM, transferring control to the VMM; handling the event in the VMM; and returning control to the VM.

It should be noted that both the VMM and the Hypervisor can have all the required functionality for implementation of the invention, and all references to the VMM can also be applicable to the Hypervisor and vice versa.

Additional features and advantages of the invention will be set forth in the description that follows. Yet further features and advantages will be apparent to a person skilled in the art based on the description set forth herein or can be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
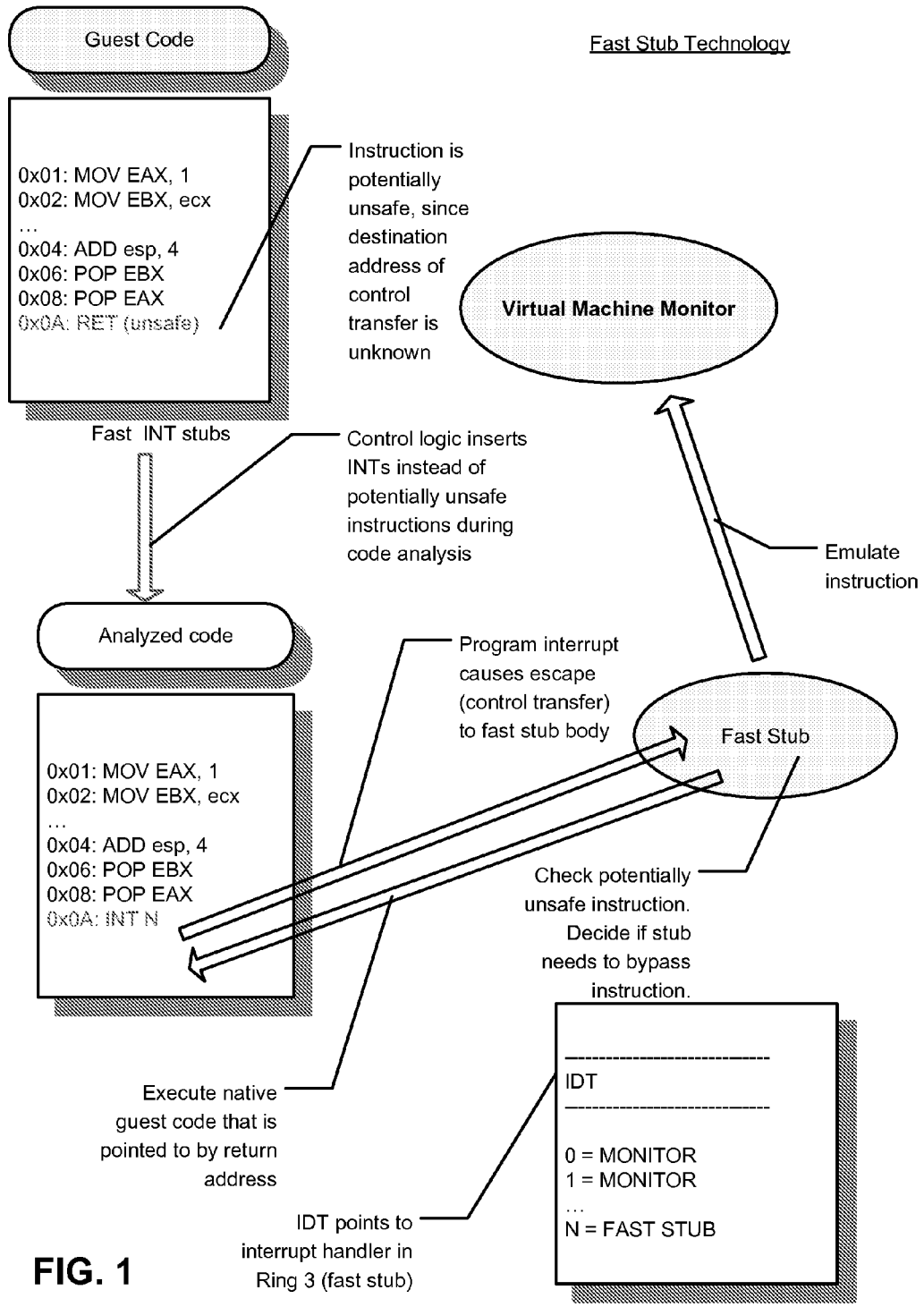
FIG. 1 illustrates how fast stubs based on event generation (using INT N) are used to reduce overhead associated with handling potentially unsafe transfers of control.

Reference will now be made in detail to the embodiments of the present invention, examples of which are illustrated in the accompanying drawings.

In the remainder of this description, it is assumed that the reader is familiar with VM concepts generally, and with INTEL processor architecture and instruction set. Therefore, the discussion of the details of the INTEL architecture is necessarily limited in this description. The IA-32 INTEL Architecture Software Developer's Manuals, Volumes 1-3, see http:www.INTEL.com/design/pentium4/manuals/index_new.htm#1, and the INTEL Itanium Architecture Software Developer's Manuals, Volumes 1-3, see http:www.INTEL.com/design/itanium2/documentation.htm#manuals, which are incorporated herein by reference in their entireties, provide detailed discussions of the INTEL Architecture and VMX technology. Also, technologies, processors and chipsets from other manufacturers, such as AMD (Pacifica), MOTOROLA and so on can support the VMM approach described herein. Although particular examples relate to the INTEL architecture, the approach described herein is not limited to the INTEL architecture, and can be implemented with other processor families and processor architectures.

In the INTEL family of processors, various "privilege levels" are different modes of operation that are characterized, e.g., by different sets of available instructions and accessible registers. Privilege levels may be set through appropriate processor registers.

The techniques described herein provide an effective procedure for implementation of a VM designed for execution of user instructions and particularly instructions of the VM's OS (usually referred to as "guest OS"). Types of instructions that can be singled out in the software code to be executed in the VM include "safe instructions" and "unsafe instructions." Additionally, some kinds of instructions can be singled out in the software codes if the instructions themselves are unsafe, but the code sequences are safe. Safe instructions are instructions that produce the results expected by the guest OS when executed in the VM. Unsafe instructions are instructions that produce results different from those expected by the guest OS when executed in the VM, or that are unsafe from the viewpoint of the VMM or HOS. Additionally, some instructions can be either safe or unsafe instructions, depending on the environment that is set up by the VMM for their execution, e.g., guest OS code. Such an environment will be referred to below as "VM context."

The context settings may include hardware processor registers settings, which define instructions being executed by the hardware processor. Also, context settings may include system libraries being accessed by applications, mapped memory pages, settings of the hardware being emulated in the VM and so on. In one approach, original (i.e., source) guest code can be executed using the software debugger as follows:

Before execution, the VMM analyzes the original guest code. The VMM generates modified (i.e., target copy) guest code by replacing potentially unsafe instructions with breakpoints (e.g., INT3 interrupts). During execution of the modified guest code, control is transferred to the VMM at the interrupts. In turn, the VMM, depending on the state of the VM, either restarts the guest code without emulation or emulates the potentially unsafe fragment of guest code in the emulation mode.

Note that "original" guest code (or "source" guest code) generally refer to unanalyzed guest code, while "modified" guest code (or "target" guest code) generally refer to analyzed and modified guest code that has been processed (e.g., by insertion of breakpoints in the original guest code) for direct execution by the VM. In one embodiment breakpoints can be placed directly into original code. Alternatively, breakpoints can be placed into a copy of the portion of the original code. In that case, the same absolute effective (EIP) addresses of the instructions of the target code should be maintained. One possible technique can be to change guest code segment (CS) descriptor base address in the GDT (global descriptor table).

In one approach to Virtual Machines, a software debugger can be used to set up breakpoints, or interrupts, forcing the processor to raise exceptions (e.g., to prevent illegal access to memory or to input/output devices). Optionally, instructions that cause the processor to raise exceptions can be used as breakpoints.

Exception handling may be based on using a paging model of address processing by the processor, and can be implemented as follows:

1. A page of the original guest code is analyzed;
2. A copy of the page of the original guest code is created, and certain unsafe instructions, e.g., instructions that may cause an event are replaced with breakpoints to generate a modified (analyzed) page of guest code;
3. The modified (analyzed) page of guest code is executed; and
4. During execution of the modified (analyzed) page, control is transferred to the VMM if exceptions are raised at the breakpoints, and the VMM (by analyzing the VM context) either (i) generates bypassing code, which does not contain unsafe instructions, or (ii) provides for execution of the unmodified original guest code, or (iii) provides for execution of different code, which ensures that the execution of the potentially unsafe instructions becomes safe, for example, by adjusting the VMM context.

Note that in addition to the modified page of the guest code, a copy of the original page of the guest code is also stored, because the VMM subsequently provides for the safe execution or emulation of instructions based on analysis of the original guest code. For example, on-the-fly patching of original pages of code may be performed or an interrupt table may be set up to transfer control to guest tools when interrupt is raised as a result of handling an instruction that can cause an event.

Usually the guest OS code includes many relative JMP, CALL, WRITE, RET or other instructions that can unsafely modify VM context or machine state or try to access a memory area that has not been allocated to a particular VM. Their primary function and the primary reason for these instructions being unsafe is passing execution to instruction at another address that is stored at some location in memory. Therefore, the following description will primary deal with such instruction stubbing, although this is just one of many examples, and the invention can be used for stubbing any potentially unsafe instruction.

Therefore, what is needed is a mechanism that can rapidly check whether the JMP instruction, upon being encountered, is safe, or whether an unsafe context switch instruction may be implemented or bypassed in the same context or whether the VM context needs to be invoked. This can still be performed in the native mode, without switching to the context of the VMM, by using stubs. Such a fast stub is, in effect, a small handler, or processing routine, whose primary (or even sole) purpose is to determine whether the JMP instruction is safe or unsafe. If the JMP instruction is unsafe, then the stub will switch the context to the VMM, such that the JMP instruction will then be processed as an unsafe instruction in the VMM, for example, by emulation. If the JMP instruction is safe, which can be the situation in as many as 99 percent of the cases, then control can be directly transferred to the location to the JMP instruction's destination address. Note that in the INTEL architecture, if INT3 is used as the interrupt that raises exceptions at privileged but unsafe instructions, then INT1 (or some other interrupt) can be used to handle the JMP instructions to transfer control to the so called fast stub (JMP instruction handler). (Alternatively, if INT1 is used for raising exceptions and context switching, then some other interrupt INT (n), such as INT3, can be used.)

Note that the handling of the JMP instructions if they in fact turn out to be safe, using the fast stub approach takes approximately 200 clock cycles in the Pentium IV architecture—compared with roughly 4,000 clock cycles for full VM/VMM context switch. In other words, the processing of JMP instructions is much closer to direct execution than to the heavy-overhead scenario of fully emulating the JMP instructions at the highest privileged level in the VMM.

If INT3 is the "full blown" context switch, then INT1 can be used for fast stubs. Note also that the advantage of using INT1 is that it is a single byte instruction, which is guaranteed to fit within the body of the guest code, without having to shift any of the subsequent instructions. In other words, the offset addresses of all the instructions within the guest code can be preserved. Other instructions that are multi-byte instructions can use other interrupts that are, correspondingly, multi-byte interrupt.

For example, INT1 interrupt can be used to process one byte instructions, which are RET, PUSHF and POPF. Two-byte interrupt INT (n) can be used to process multi-byte instructions such as RET (n), indirect JMP and indirect CALL. These instructions account for approximately 95 percent of the emulated instructions, absent a mechanism for processing them in a native mode, or something close to the native mode.

For such instructions, stubs can be used to quickly check the "safety" of an instruction. A stub is a remote procedure called upon to perform some task. The stubs can be located in the VM context, as well as in VMM context. In the case of the indirect JMP instruction execution, when an exception is raised (due to INT1), the VMM gets control and checks whether the transfer of control is intra-frame or inter-frame. If the transfer is an intra-frame transfer of control, then execution of the guest code is resumed. If the transfer is an inter-frame transfer of control, then the current frame is switched, and execution of the guest code is also resumed. Fast stub switches to full JMP emulation if the frame check fails.

At this point, it is useful to discuss how paging and frame technology fit in with fast stubs. A "page," in the INTEL architecture, is a 4 KB block of memory. This is a relatively small number. As such, for typical operating system or user application code, there will be numerous transfers of control between pages. Accordingly, a "frame" is a contiguous combination of sequential pages, whose size is empirically chosen to be not too large and not too small, so that most transfers of control are within a single frame and do not raise exceptions. Empirically, a 4 MB frame is approximately optimal, although the particular optional size of the frame depends on the processor and the code being executed.

Consider, therefore, a situation when guest code begins to be executed, but the page in which that guest code is located is not yet mapped into the frame. Therefore, attempting to execute the first instruction in the guest code will generate a page fault. In other words, the page with that guest code will be initially marked as not present. The guest code in that page will be analyzed, appropriate exceptions and interrupts added to the code, and a page of analyzed code corresponding to the original (source) code will be created. That page with the analyzed code will be mapped to the frame. Over time, a number of other pages with the guest code will be analyzed, and added to the frame, ultimately filling up (or, optionally, only partly filling) the entire 4 MB frame.

The guest code is then executed in such frames. Frame code segment base is calculated, thus, the EIP of the code located on modified pages corresponds to original EIP.

One of the aspects that needs to be addressed when virtualizing the INTEL processor is a phenomenon sometimes referred to as "ring compression." In the INTEL architecture, there are four privilege levels, with level (ring) 3 normally being used for user application code, and ring 0 normally used for operating system code. Some operating systems utilize all four levels available in the INTEL architecture, while other utilize only ring 0 and ring 3. For example, WINDOWS only uses ring 3 for user application code, and ring 0 for OS code. OS/2, on the other hand, utilizes all four ring levels. However, in the Virtual Machine as discussed herein, all the levels are compressed into a single level—ring 3. Thus, There are two common type of ring compression:

0/1/2/3 to 1/2/3 rings; and
0/1/2/3 to 3 ring.

That means that the guest code can "think" that it is running in any of the privilege levels, however, in reality it is always running on ring 3 level. This, however, needs to be transparent to the Virtual Machine. The VMM cannot launch the guest code "as is" due to ring compression, because there might be unsafe instructions there. Ring compression is a well known technology to de-privilege guest code, so that it cannot corrupt supervisor's (i.e. VMM's) system areas.

Unsafe instruction's behavior can depend on privilege ring where it is executed. For example, the pop flags (POPF) instruction affects fewer flags on ring 3 than it does on ring 0. If the VMM compresses guest ring 0 to real ring 3 (0/1/2/3 to 3), POPF does not affect all the flags. Therefore such instructions are unsafe and should be generate exceptions.

To detect unsafe instructions, VMM should analyze guest code before execution and, as one option, generate a copy of guest code where unsafe instructions are marked by events that trigger exceptions. For example VMM can place INT3 (or INT n) into the guest code, where the unsafe instructions were.

As one option, to execute a copy of the guest code, the VMM creates an environment by mapping analyzed pages to linear space using frames.

As long as the destination address to which control is transferred is known for all instructions within the analyzed code, it is at least theoretically possible to have a frame, all of whose guest code instructions can be directly executed in the native mode.

During analysis of guest code, instructions to transfer control to previously unknown addresses might be encountered (e.g., RET, CALL EAX, etc.). For such instructions, it is impossible, during the code analysis phase, to determine whether the transfer of control is safe (i.e., an intra-frame transfer) or unsafe (i.e., and inter-frame transfer).

In this case, all the RET instructions are potentially unsafe since a priori all the RET instructions depend on a CALL instruction that can cause a "return back to another frame" transfer. This is an issue present in virtually all modern processor architectures—there are instructions that transfer control to a destination address that is determined at run time, rather than at the analysis stage. Some examples of these instructions are CALL, JMP, RET and RET(n), in the INTEL architecture. Other processor architectures have similar instructions.

It should also be remembered that even those instructions for which the destination address is unknown, in greater than 90 percent of the cases, control is transferred within the same frame. Therefore, with these instructions, it is necessary to address the issue of how to execute these instructions in something approximating the native mode, without having to go through the full context switch to the VMM, and back to the VM after the emulation.

To address the issue of increased overhead for processing inter-page transfers of control, a paging technique can be used that integrates pages of guest code into linear frames. As a result, intra-frame transfers are safe, inter-frame transfers are also safe, while out-of-frame transfers are unsafe. Thus, the number of exceptions raised during execution of the guest code substantially decreases, and overhead is reduced accordingly.

Note that more than one frame can be mapped simultaneously. Each frame can represent a different guest OS address range. All inter-frame control transfers for currently mapped frames can run natively, without switching to the VMM context. An inter-frame control transfer targeting a currently unmapped frame leads to invoking the VMM and remapping a least-used frame with a new one. Then, execution continues. This allows covering control transfers of a very wide address range that cannot be covered by a single "monolithic" frame.

In one approach, a frame is created as follows. An area of guest linear address space that is divisible by 4 MB (an exemplary size selected based on empirical considerations) is selected for the executable code. To identify this area in the VM context, a set of values of a page directory entry (PDE) is used, where each PDE can reflect 4 MB of the address space. Thus, a frame is a set of sequential pages, where the number of pages in a particular implementation is determined beforehand, and where each of the pages is defined by a corresponding index of the PDE.

In another approach, during analysis of the instructions of a frame of guest code, the frame is initially characterized only by one addressable page, and the other pages are mapped as "not present." Subsequently, the frame can be filled with analyzed pages of guest code. If control is transferred to a page that is mapped as "not present," an exception is raised (i.e., a page fault exception), and the VMM obtains control and analyzes the next portion of the guest code. After analysis, the VMM transfers control back to the frame.

INT(n)-based stubs divide interrupts to two type: one standard type of interrupt, such as INT3, to mark all unsafe instruction to pass execution to the heavy-duty VMM universal handler; and at least one interrupt, such as INT1, INT n1, INT n2, etc., to mark unsafe instructions that can be bypassed after a quick check. (Note that interrupt numbering here is exemplary only.) Thus, two types of interrupts can coexist—standard and bypassed ones. In a real system, the interrupt number can be swapped: e.g., INT1 can be used for standard emulation and INT3 can be for instruction stubbing. In this discussion, INT3 will be used for marking unsafe instruction to emulate them in VMM, and INT1 or INT(n) will be used for marking stubbed unsafe instructions.

In one approach, fast INT(n) stubs are used to replace unsafe instructions (such as RET or RET(n)) with INT1 opcodes (again, the interrupt number is exemplary). If fast stub technology is not used, unsafe instruction is marked by standard scheme, with interrupt generation by INT3 to switch to the VMM's full instruction virtualization/emulation algorithm. The interrupt raises an exception, a switch from a Ring 3 privilege level to a Ring 0 privilege level (in the INTEL architecture) occurs, and the VMM emulates unsafe instructions. Then, after instruction emulation, VMM passes execution back to Ring 3 to the next instruction of guest OS code. Native guest code execution continues up to the next instruction that generates an interrupt and the process repeats again.

This technique is time consuming and can be optimized by replacing some instructions with an INT(n) interrupt and a lightweight handler. An exception handler, corresponding to the n vector of the interrupt, is on the same Ring 3 privilege level and simply checks whether the unsafe instruction can be run natively or whether it should be emulated by using main scheme (e.g., a standard INT3 emulation based described above). In other words, some types or classes of instructions can be replaced with INT(n) interrupts. Control is then transferred to an exception handler, which either executes (bypasses) the instruction and transfers control back to the native code or calls the Ring 0 privilege level exception handler.

In this discussion, "bypassing" refers to excluding some portion of the native code (or even single instruction) from direct execution. Bypassing the instruction in the Virtual Machine context includes forming page of analyzed code and executing that page of analyzed code, instead of the source or native code. Bypassing even unsafe instruction after code analysis improves performance, since it does not require switching the processor's mode and/or replacement of current context settings while exiting exception handler. This may be referred to as "lightweight virtualization."

In this case, a further check of the bypassed instruction(s)' privilege level does not need to be performed, and direct execution of the bypassing instruction is less time and resource intensive.

FIG. 1 illustrates the concept of how fast stubs and INT(n) interrupts are used to reduce overhead associated with handling potentially unsafe transfers of control. As shown in FIG. 1, the guest code has an unsafe instruction, in this case the RET instruction at the address 0x0A. In this case, it is potentially unsafe because the address to which it returns, or transfers control to, is unknown at the time of code analysis. The guest code is analyzed, and the RET instruction is replaced with an INT(n) interrupt. In this case, if the INT(n) interrupt is actually INT1, then the fast stub is called upon encountering the INT1 interrupt.

The fast stub checks whether the instruction is actually safe, or unsafe, rather than merely potentially unsafe, with the empirical observation that in most cases, the instruction is safe. If the instruction is actually safe, in other words, if control is transferred within the same frame, then control is returned to the instruction following the INT(n) interrupt. In the case of instructions that transfer control, e.g., RET in FIG. 1, execution is resumed from the instruction to which the control is transferred. In the rare cases where the RET (in this case) instruction is actually unsafe (as opposed to merely potentially unsafe), control is then transferred to the Virtual Machine Monitor, where the unsafe instruction is handled, through the full context switch to the VMM and subsequent emulation.

Thus, the stub in FIG. 1 checks several things:

(a) Whether the jump to a previously unknown destination address is within the same frame. In this case, the stub permits the jump.

(b) If the jump is to a different frame (outside the current frame), then the stub checks whether that destination frame has already been mapped to the 16 MB superframe (see discussion below regarding superframes). If it has, then the jump is permitted in the native mode.

(c) If none of the above conditions are satisfied, then the jump (or other control transfer) is emulated in the VMM. The VMM therefore, as part of the emulation, needs to check where the destination address is, whether it needs to add the destination page to the frame, or add the frame to the superframe linear address space, whether it needs to "toss out" one of the frames already in the superframe and map a different frame into the same (in this case) 16 MB address space, execute or emulate the jump (or control transfer), and then return control back to the VM.

The optimization as described above works particularly well for WINDOWS, because, as a practical matter, virtually all the code at issue fits within four or five frames, the absolute majority of inter-frame control transfers is between two or three frames, and the remaining one or two occur very rarely. Thus, virtually all inter-frame transfers can be handled in something approximating a native mode.

Another related optimization aspect is the handling of the INT(n) interrupts themselves. Compared to a "regular" instruction, which takes approximately 20-30 clock cycles to execute, the handling of the INT(n) interrupt itself takes several hundred clock cycles. Sometimes the stub handler can take 600 clock cycles. This is another significant source of overhead, which needs to be addressed.

Therefore, it is desirable to avoid the use of INT(n) interrupts, wherever possible, if the same purpose can be accomplished by using other mechanisms. It so happens that in the INTEL architecture, the simple JMP is the fastest way to transfer control. The simple JMP takes approximately 10 clock cycles. This is a dramatic improvement over the use of interrupts. The simple JMP instruction can be used to transfer control to a stub, which will then perform the appropriate checking of the original instruction and the destination address. It can reduce the number of cycles needed by the stub handler to about 60 clock cycles.

Thus, fast JMP stubs can used to reduce overhead associated with interrupts. Instead of INT(n) opcodes, JMP instructions are used to replace specific instructions or sets of instructions. This technique operates similar to, but is faster than, the technique using the INT(n) stubs. However, one problem in this case is that a JMP instruction opcode is longer than an INT(n) opcode. Thus, a block of instructions can be replaced with a first JMP instruction (i.e., if the JMP opcode is five bytes in length, then the unsafe instruction itself and up to four instructions before it are replaced). If the instruction that it replaces in the original code is shorter than five bytes, then adjacent instructions (either the four bytes before, or the four bytes after, in the case of using a JMP to replace an INT(n) interrupt) would have to be overwritten. This problem is addressed using "shadow page" and "shadow frame" concepts. In addition to the analyzed code, a page with shadow code is created. Those four (or however many) bytes that were overwritten by the JMP instruction are copied to the shadow page, in order to avoid "losing them."

The safe instructions that are replaced by the first JMP instruction are copied to a temporary (shadow) page called by the first JMP instruction. A second JMP instruction that points to a stub is inserted after the safe instructions on the shadow page. During execution, the first JMP instruction transfers control to the safe instructions on the shadow page. After the safe instructions are executed, the second JMP instruction transfers control to the stub. Inside the stub, the potentially unsafe instruction is checked to determine whether it can be run natively or whether it should be emulated by the primary INT3 scheme.

Using JMP stubs is faster than using INT(n) stubs because the exception for INT(n) handler requires additional pushing and saving of the register stack and subsequent popping and loading of the stack.

Figure 2:
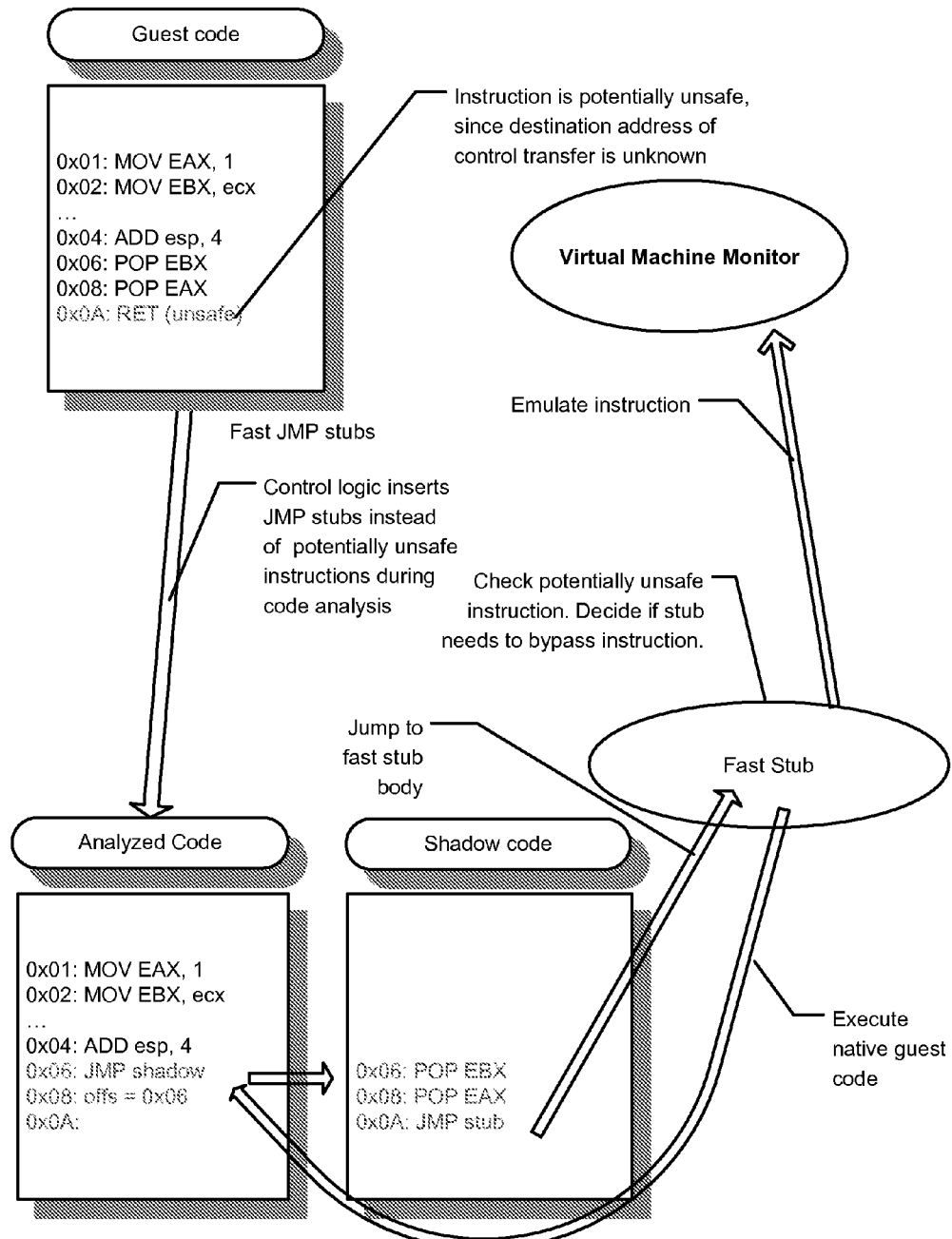
FIG. 2 illustrates an alternative optimization of fast stubs that uses shadow pages and shadow frames.

FIG. 2 illustrates the use of shadow pages and shadow frames in connection with JMP stubs. As shown in FIG. 2, the original guest code contains a potentially unsafe RET instruction. The analyzed code contains a jump to a shadow page. The shadow page contains the instructions just prior to the RET instruction in the original guest code, in this case, POP EDX, and POP EAX. As the analyzed code is executed in the native mode, the control is transferred to the shadow page upon encountering the JMP instruction. The two instructions POP EDX and POP EAX are executed, and then control is transferred to the fast stub. The fast stub then handles the processing of the RET instruction, to determine whether it is safe (and control can be passed in the native mode), or unsafe (and therefore that instruction needs to be executed in the Virtual Machine Monitor).

Figure 3:
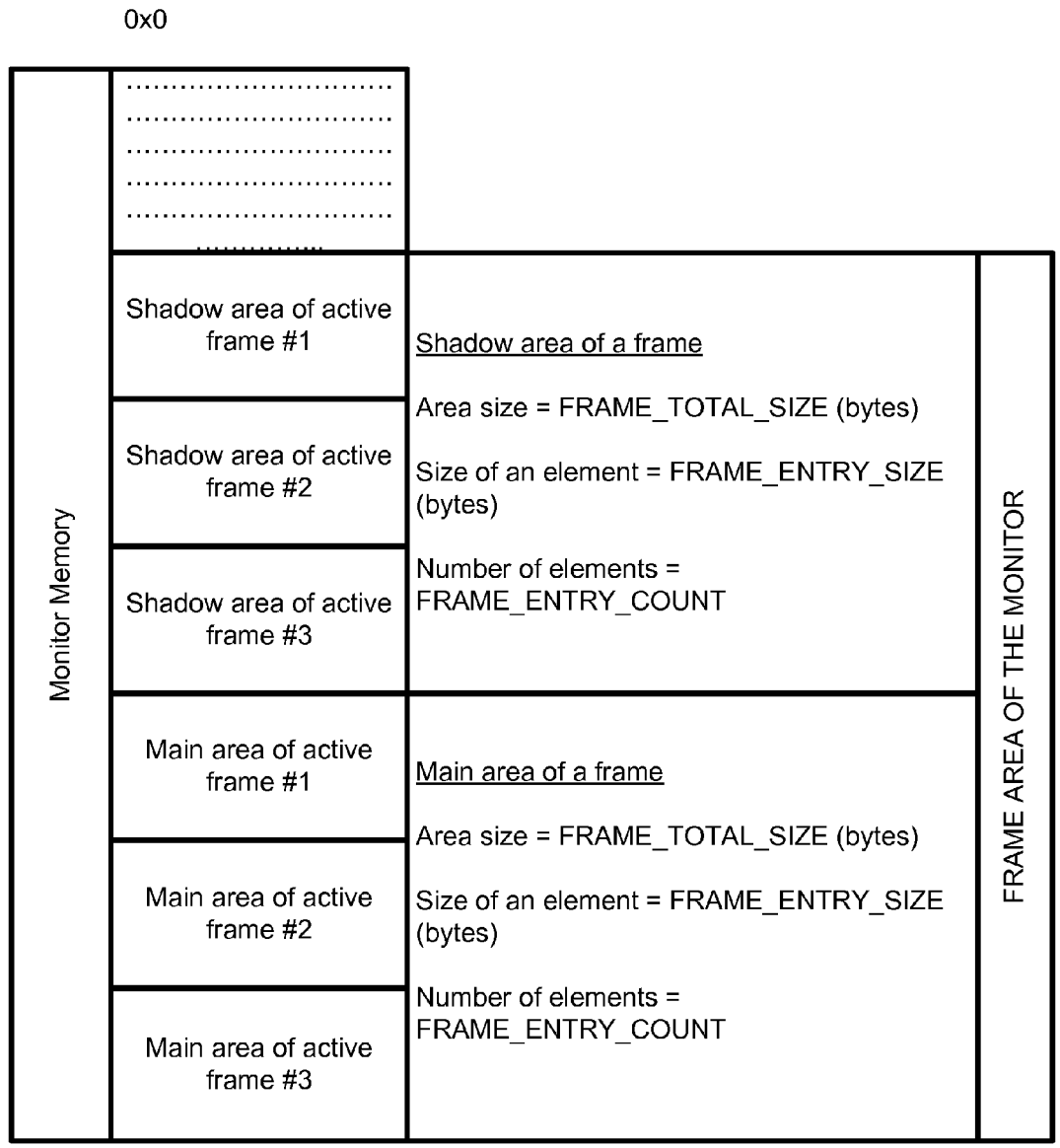
FIG. 3 illustrates an example of how frames are mapped in the Virtual Machine Monitor.

FIG. 3 illustrates the exemplary approach to how frames are mapped in the Virtual Machine Monitor. The total address space, shown on the left hand side of FIG. 3, includes several active frames that contain analyzed code, in this case, active frame #1, active frame #2 and active frame #3. Collectively, this set of frames may be referred as a "superframe." For every such active frame that contains analyzed code, there is a corresponding shadow frame, in this case, shadow frame #1, shadow frame #2 and shadow frame #3. Note that the sizes of the corresponding frames, as expected, are identical for the active frames and the shadow frames. Furthermore, it should be remembered that the invention is not limited to the use of shadow areas, or shadow areas as illustrated in FIG. 3. Dynamically sized shadow areas can be used, where all the shadow code is collected from all the instruction blocks of the analyzed code. In this case, a guest instruction pointer translation needs to be done during exceptions on shadow pages. Note also that as a practical matter, most of the code in the shadow frame is usually null opcodes, or NOP opcodes, although this need necessarily not be the case, and the invention is not limited to this implementation.

For example, the monitor can divide the available memory into a cache of analyzed pages, a cache of shadow pages, an area where fast stubs reside, and an area where the VMM's residual data and other "housekeeping" information can reside. The active frames can be divided into active frame #1 and active frame #2, that contain analyzed code. For these frames, there are corresponding shadow frames #1 and shadow frame #2.

FIG. 3 shows one example of superframe organization. An alternative organization can utilize superframe division into frames. Each frame includes a shadow part and a part with analyzed pages. In this case, the common idea is that that the frame has shadow and analyzed code parts.

There is a special register in the INTEL architecture, called the code segment register (CS), which the processor checks prior to execution of any code. For every source code portion, there is a corresponding value in the CS register (which defines the start address of the segment, the privilege level, and the limits, or size, of the segment, such that the entire segment in memory is linear and is uninterrupted in terms of its addresses). After being analyzed by the VMM, the page is found at a different address, with the absolute addresses being different in the target code as compared to the addresses of the source code (if nothing is done to ensure that address integrity is preserved).

Note that the executed instructions addresses in fact are derived using the beginning address of the segment in the CS register as a base (translation effective address used as a simple pointer to linear one). This means, that, in order to preserve the integrity of the addressing scheme in the target page, the start address in the CS register descriptor needs to be correspondingly shifted as well. In other words, by changing the value of the start address of that segment, it is possible to ensure that instructions, which require both absolute and relative addresses to return a correct result, will get a correct address value. (For example, such a scheme allows CALL instruction to place a valid return pointer onto the stack and to pass control to a valid function). However, since the descriptor of the CS register has been modified and the code segment register no longer points to the correct area, the instructions using data access through the CS register need to be emulated. Therefore, such types of unsafe instructions are replaced with breakpoints, or exception triggers, due to code segment being marked for execute only type.

Phrased another way, the values in the CS register that previously corresponded to the guest code are replaced with new values. This is done such that the starting address in the CS register descriptor is always shifted compared to the original address for the source code. The end result is that the target page in the cache that is actually executed by the VM is effectively at the same address as the original (source) code of the guest code was.

A new base address in the descriptor of the CS register is set for the area of the guest linear space where the current frame is mapped. Note also that this is done only for the CS register. The other registers, such as the data segment register (DS), stack segment register (SS), extra segment registers (ES, FS, GS), and others, all point to where they previously pointed to in the guest code.

Figure 4:
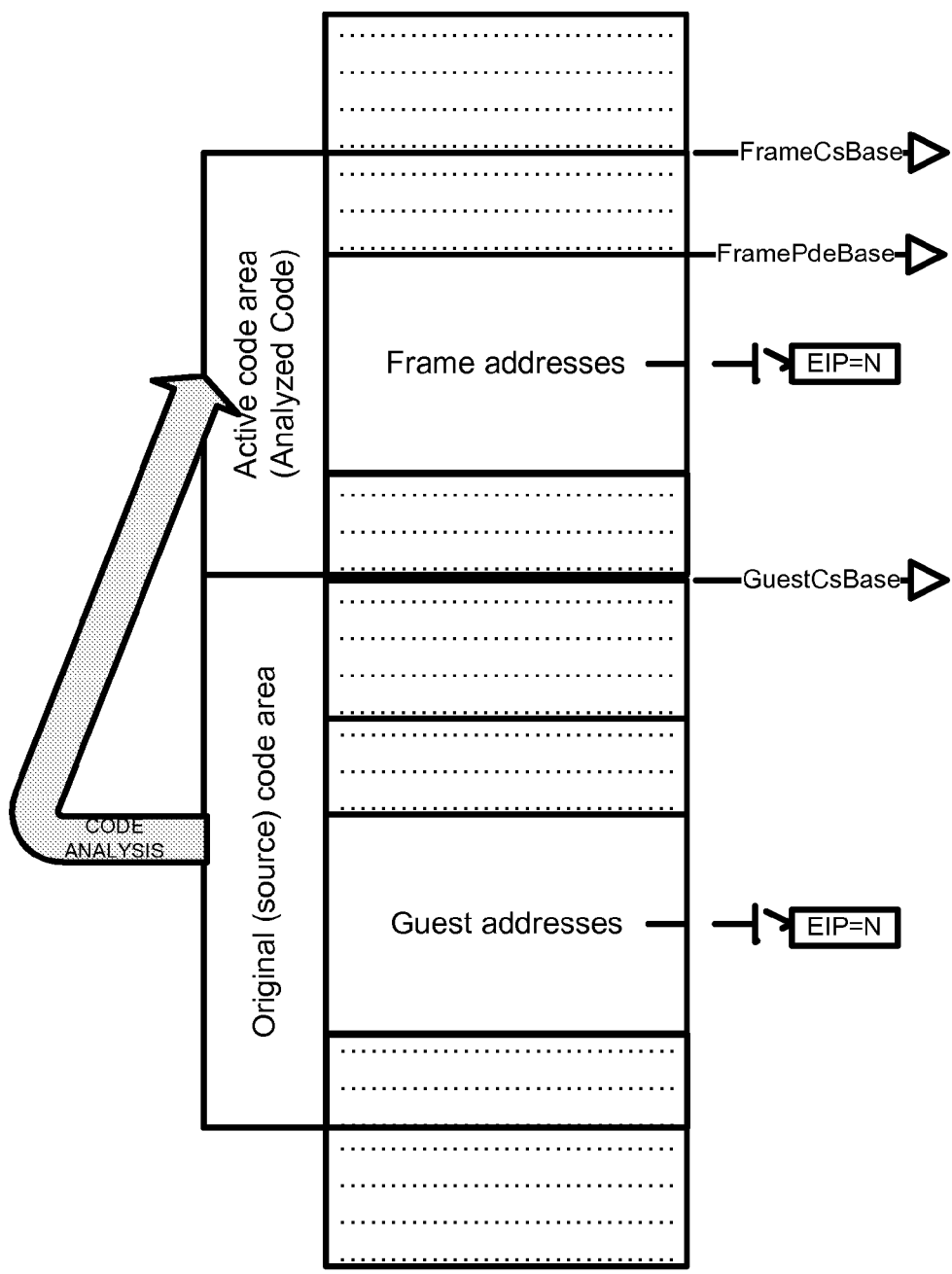
FIG. 4 illustrates the concept of using the CS register to map frames.

FIG. 4 illustrates the concept of using the CS register to map frames. As shown in FIG. 4, the address space includes the source (guest) code segments that have their own linear addresses region. The EIP points to current executed instruction. The EIP is offset from the base address value of CS segment, i.e., the linear address of current instruction is generated by adding the CS segment base value and the EIP. The VMM executes analyzed code with marked unsafe instructions. Such analyzed pages are located in the frame before execution. The Frame memory area is shifted relative to original code pages. Therefore, the VMM sets up a corresponding shifted CS segment register value, such that by adding it to the guest EIP pointer, the EIP will point to the correct analyzed code. The EIP is a pointer to the current instruction within that frame, and contains the address of the instruction that is being currently executed.

For each original guest code frame, there is an analyzed, or active, part which contains the code that is safe to execute in the native mode. The instruction pointer EIP in the analyzed code has the same exact value as the instruction pointer in the original guest code. The only difference is that the CS register points to the base address of the analyzed code segment, rather than the original guest code.

Furthermore, one of the realities of many modern operating systems is that the operating system code is often be widely separated in memory space, and frequently including several such separated areas in memory, each of which requires its own frame. Therefore, it is desirable to extend the fast stub approach described above to the multi-frame situation.

For example, in the Microsoft WINDOWS XP operating system, there is a driver area, and a hardware access layer (HAL) area, which can be separated by a large gap, for example, 200 megabytes in address space. Also, that 200 megabyte "gap" between the driver area and the HAL area might be essentially empty, with control jumping back and forth on a relatively frequent basis. At the same time, it is very difficult to construct a frame that would adequately "capture" all of the code of many such operating systems.

To address this situation, it is possible to create a linear space, for example, 16 MB in length, into which four frames are mapped, thereby forming 16 MB superframe. Each frame gets its own CS segment register (a base address), and jumps between the frames (but within the 16 MB superframe's address space) can be performed using a "far JMP" with corresponding frame selector (new CS) where control is transferred to. A far jump differs from a near jump in that the pointer to where control is transferred has two parts: a destination code segment selector and an offset in it. A near jump transfers execution within in a single code segment (and is a jump to a relative address). A far jump transfers control outside the segment (and is based on the absolute address). However, the destination address of a far JMP instruction is known in advance, and such far JMPs can be handled natively. The jump is accomplished by changing the value of the CS register descriptor, in other words, by changing the base address.

The CS register holds the base address, or the address from which all other addresses are calculated. Thus, an instruction that looks like JMP+100 jumps to the [current address+100], where the current linear address (and, as a result, the physical address) can be calculated using the CS register.

Thus, in order to preserve the offset addresses for the jumps within each frame, the base address, in other words, the value in the corresponding CS register, is changed, to "fool" the processor into thinking that it is still executing within the same frame. The far JMP instruction accomplishes that by specifying both the CS (base address) value and the offset address (within the particular frame) for the destination address.

Note that although the number of clock cycles necessary to execute a far JMP is greater than the number of clock cycles necessary to execute a near or short jump, nonetheless, the number of clock cycles necessary even for a far JMP is still far less than the number of clock cycles required for a full context switch and emulation.

Figure 5:
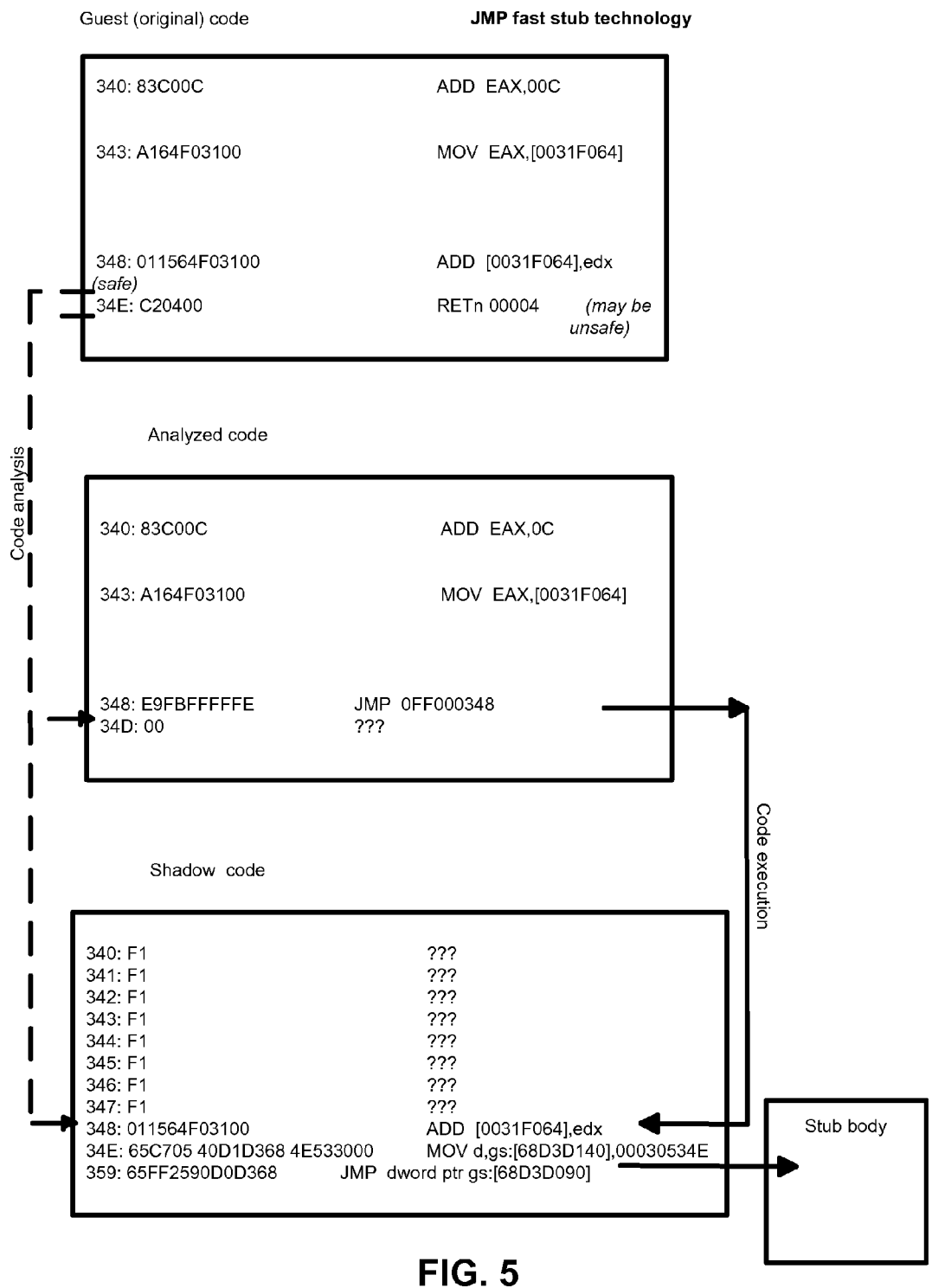
FIG. 5 illustrates an example of fast stubs technology as applied to the INTEL architecture and the RET(n) instruction.

FIG. 5 illustrates an example of fast stub technology as applied to the INTEL architecture and the RET(n) instruction. As shown in FIG. 5, the guest code contains a number of instructions, starting with add EAX, OC (in other words, adding the constant OC (hex) to the current contents of the register EAX). The RET(n) instruction, which may be unsafe, is replaced in the analyzed code by a five-byte-long JMP instruction. To preserve the address offsets within the code, both the byte at which the RET(n) is located, and the previous four bytes, are overwritten by the (near) JMP instruction. The JMP instruction transfers control to the shadow code, where the add instruction is executed. Then control is switched to the actual fast stub body by the indirect JMP instruction (through the stub handler pointer). Once the stub is executed, control is either transferred back to the RET(n) instruction or the RET(n) instruction is emulated in the Virtual Machine Monitor.

Figure 6:
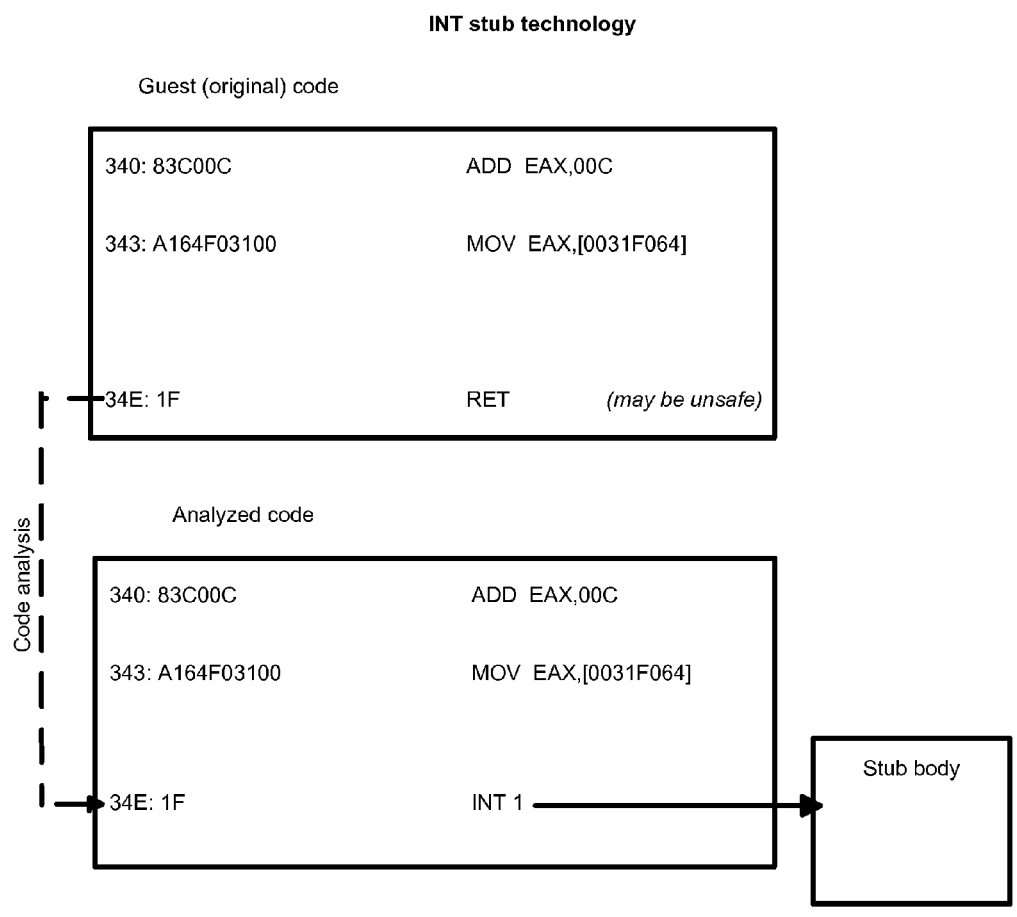
FIG. 6 illustrates the application of the fast stub technology to software interrupts.

FIG. 6 illustrates the application of the fast stub technology to interrupts (although it should be understood that the present invention is not limited to this embodiment). Here, the guest code contains the RET instruction, which is replaced by an INT1 interrupt. The INT1 interrupt directly calls the stub body, which determines whether the instruction is safe or unsafe. The handling of the RET instruction in the fast stub is as described above.

Unsafe CALL or JMP instructions can be handled with or without modification of opcodes. In one embodiment, when the processor supports page execution attributes (such as "execute only" or "no execute") any attempt to transfer control pages out of the current frame, however, will raise a page fault exception (only pages of the current frame will be marked as available for code execution). Consequently, the required frame can be accessed after the original guest code is analyzed.

If the stubs are used for accelerated emulation, it is possible to save the guest context. For example, for instructions, which are processed using the stub technique, a simple emulation can be used that includes checking the address of the transfer of control and intra-frame transfer of control, or frame switching. During the execution of the code that has been processed by the software debugger, the addresses of the instructions are not changed. In one approach, the addresses transferred to the instruction pointer register (EIP) during execution of the analyzed code with the breakpoints inserted are identical to addresses of the original code. After execution of the stub, the EIP addresses will be changed, but the original EIP addresses can be obtained from a stack, because when the stub is called, the initial EIP is saved in the stack.

It should be noted that the approach described herein is applicable to most, if not all, types of potentially unsafe instructions, not just JMP, CALL, RET or instructions that transfer control, where the stub can verify whether the potentially unsafe instruction (whatever it may be) is in fact unsafe, or safe. The invention can also be used for stubbing a group of sequential instructions. One example of group instruction stubbing on the Intel processor is marking pair MOV EAX, CR3; MOV CR3, EAX flushed TLB cached, by a single fast stub.

Another current issue in processor virtualization is efficiency of guest OS code that is running under control of a Virtual Machine Monitor. Operating system code is typically optimized in the absence of any virtualization considerations. A great deal of effort goes into ensuring that a particular section of code, especially if it is one that is frequently executed, takes maximum advantage of processor resources, such as registers, the full instruction set of the processor, and so forth.

However, virtualization presents a different set of problems as they affect the efficiency of code of a guest operating system that is running inside a Virtual Machine. Many of the instructions that the guest OS code uses trigger context switches from the Virtual Machine to the VMM. Some examples of this are attempts by the guest operating system to use hardware-assisted virtualization commands (such as the VT-X set of commands for the Intel processors), attempts to write to certain registers, such as the CR3 register or the TPR register, and so forth. If a particular instruction is not permitted in user mode, but is permitted in the highest privilege mode, then guest operating system code might not only contain that instruction, but might also utilize it on a relatively frequent basis. For example, writing to the Task Priority Register (TPR) requires the highest privilege level. The Task Priority Register (TPR) provides a priority threshold mechanism for interrupting the processor. Only interrupts whose priority is higher than that specified in the TPR will be serviced. Other interrupts are recorded and are serviced as soon as the TPR value is decreased enough to permit it. This enables the operating system to temporarily block specific interrupts (generally those with low priority) from affecting execution of higher-priority tasks. The Microsoft Windows operating system could repeatedly read and write to the TPR register, because performing some function in a non-virtualized Microsoft Windows operating system might be more efficient that way.

On the other hand, if each such attempt to read and write to the TPR register resulted in an exception, and a context switch to the VMM, a block of code that is highly efficient and highly optimized in theory becomes extremely inefficient and slow in practice. A full context switch from the VM to the VMM takes approximately 4000 clock cycles for the Intel processor. A similar number of clock cycles is required to switch the context back to the Virtual Machine. This should be contrasted with only a few clock cycles needed to execute the write to TPR register instruction (in the INTEL processor architecture, writes to memory address FEE0-0080H assigned to the Task Priority Register). In other words, a block of code that contains multiple such reads and writes to the TPR register might execute two or three orders of magnitude slower when the operating system is virtualized, then when the same operating system runs in a native mode.

The other factor to consider in this scenario is the fact that the virtualization mechanism, such as a Virtual Machine Monitor, or a hypervisor, is "fairly close" to the actual hardware—the virtualization mechanisms typically are not aware, or do not take into account, which particular operating system is running inside a Virtual Machine—the virtualization approach of a conventional VMM or hypervisor is the same, regardless of whether the guest operating system is UNIX, LINUX, Windows, Solaris, or something else. This is typically done because the VMM and the hypervisor need to be able to handle any guest operating system (including guest operating systems that "behave badly", and it is also done because of the hypervisor and/or the VMM need to function relatively efficiently.

Attempting to optimize the VMM and the hypervisor to be more tightly coupled to a particular operating system means a loss of universality, as well as increased complexity of writing trusted VMM/hypervisor code. It also can run into version problems, where a VMM optimized for one version of one operating system might not be optimized for a different version, or the next version, of the same operating system.

The solution to this problem, therefore, lies in a priori knowledge of some characteristics of the guest operating system that is running inside the Virtual Machine. Each guest operating system can be analyzed, either before the guest operating system loads, or at the time of loading but before run-time, or at run time. The analysis of the code involves scanning the guest operating system code, and creating a shadow copy of the code, which can then be optimized, particularly with virtualization goals in mind. The functionality of the modified guest operating system code can remain the same, as far as the guest operating system is concerned. As one example, where the guest operating system repeatedly reads and writes to the TPR register, the relevant block of guest OS codes can be modified, to replace the instructions that read and write to the TPR with other instructions, that either use a different register, or use a location in memory.

Therefore, to achieve the objectives described herein, a driver, or a handler (or "Guest Tool"), can be located in the Virtual Machine, such that the driver has "knowledge" about any peculiarities of the particular guest operating system. Since each guest operating system has its own inefficiencies that relate to virtualization, the driver, or Guest OS tool, can scan the code of the guest operating system, and replace those portions o the code that are inefficient, from the perspective of virtualization, with code that is more efficient.

As one example it could replace instructions that otherwise would interrupt and/or context switches between the Virtual Machine and the VMM, with code that has an equivalent result, but uses other instructions that do not require such a full context switch. Each operating system, "and/or each version of the operating system, can have its own guest OS tool." It should be noted that preferably, the guest OS tool is loaded into Virtual Machine space, and runs there. However, as another alternative, the VMM and/or the hypervisor can also support the same tool functionality. Although in one embodiment, the VMM and/or hypervisor do not have or need "knowledge" of which guest operating system is running in each Virtual Machine, as an alternative embodiment, the virtualization mechanisms can acquire such knowledge, and, where acquired, can themselves run the handler routine to optimize and patch the guest OS code for virtualization. As noted earlier, such an optimization can occur before the Virtual Machine is launched (in other words, it can occur on guest OS code while it is on a disk drive, and then a modified copy is loaded into memory by the Virtual Machine. Alternatively, it can occur when the original guest OS code is loaded into memory, but before execution. As yet a further alternative, modified code can be created (patched) "on the fly", while the guest OS code is executing. For example, when the first context switch is triggered by the Virtual Machine, the VMM can run the analysis on the page or block of guest OS code, generate a new page (or some other unit of code) for the guest OS to execute, load that code into memory, and then transfer control to that code. The VMM can invoke its own tool or handler, which runs in kernel space, or, as yet a further option, can invoke the tool that runs in guest OS space.

As yet a further option, the driver, or guest tool, can determine that the patching of the guest OS code is best done inside the VMM, and can invoke the VMM using either an interrupt, or hardware virtualization instructions, such as VMcall. The VMM can then analyze the code that triggered the event, and decide on the best approach, which can include catching the code, or emulating a block of code in VMM space. As yet a further option the VMM can determine to patch not just the instruction that triggered the context switch (and a few instructions going forward), but also several instructions going back. As yet a further option the VMM can run a signature checker on the code, as described in co-pending application Ser. No. 11/463,339, filed on Aug. 9, 2006, and attempt to detect patterns around the instruction that triggered the context switch, where the patterns are inefficient from the perspective of virtualization.

The following example is illustrative of the concepts described herein. It is a fairly common example of inefficient code inside unmodified an Guest OS (WinXP ACPI Hal):

Inefficient code:

| | | |
|---|---|---|
| 0000092E: C7058000FEFF41000000 | mov | d,[0FFFE0080],000000041 |
| 00000938: 884208 | mov | [edx][00008],al |
| 0000093B: C3 | retn | |
| 0000093C: A18000FEFF | mov | eax,[0FFFE0080] ; |
| <--- TPR Read | | |
| 00000941: C1E804 | shr | eax,004 |
| 00000944: 8A8088086C80 | mov | al,[eax][0806C0888] |
| 0000094A: C7058000FEFF41000000 | mov | d,[0FFFE0080],000000041 |

Efficient code:

| | | |
|---|---|---|
| 0000092E: C7058000FEFF41000000 | mov | d,[0FFFE0080],000000041 |
| 00000938: 884208 | mov | [edx][00008],al |
| 0000093B: C3 | retn | |
| 0000093C: E88??????? | call | Fake_TPR_Read ; |
| <--- TPR Read | | |
| 00000941: C1E804 | shr | eax,004 |
| 00000944: 8A8088086C80 | mov | al,[eax][0806C0888] |
| 0000094A: C7058000FEFF41000000 | mov | d,[0FFFE0080],000000041 |

Fake_TPR_Read:

| | | |
|---|---|---|
| 00000000: 9C | pushfd | |
| 00000001: FA | cli | |
| 00000002: 50 | push | eax |
| 00000003: 50 | push | eax |
| 00000004: 53 | push | ebx |
| 00000005: 51 | push | ecx |
| 00000006: B800000000 | mov | eax,000000000 |
| 0000000B: BBB8010000 | mov | ebx,0000001B8 |
| 00000010: F7E3 | mul | ebx |
| 00000012: 0548A01781 | add | eax,08117A048 |
| 00000017: 8B9800000000 | mov | ebx,[eax][000000000] |
| 0000001D: 895C240C | mov | [esp][0000C],ebx |
| 00000021: 59 | pop | ecx |
| 00000022: 5B | pop | ebx |
| 00000023: 58 | pop | eax |
| 00000024: 58 | pop | eax |
| 00000025: 9D | popfd | |

Figure 8:
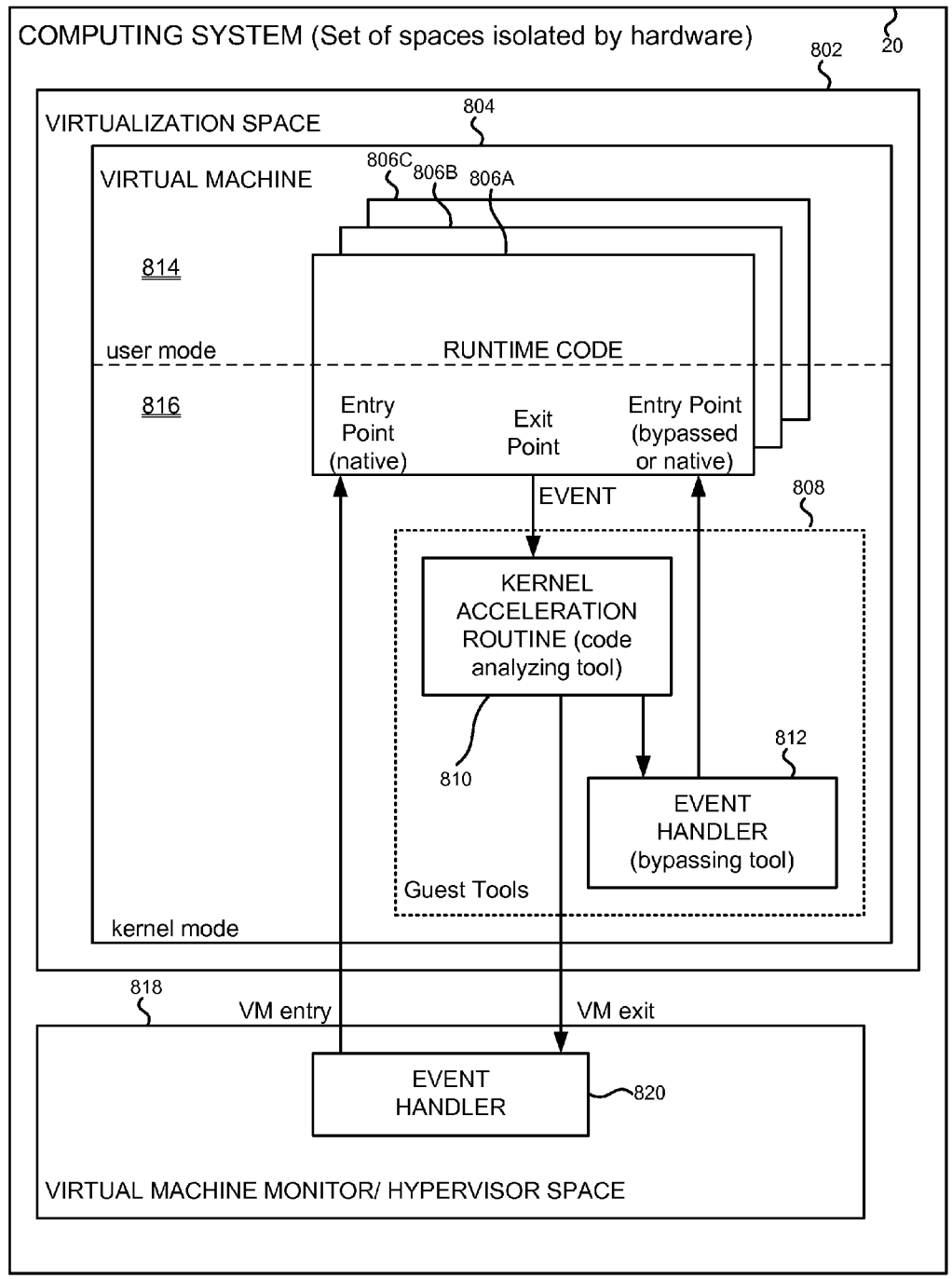
FIGS. 8-10 illustrate how guest code can be treated to increase code efficiency in the presence of virtualization support using embedded processor and/or chipset logic.

FIG. 8 illustrates one exemplary embodiment of the present invention. As shown in FIG. 8, a computer system 20, which includes a set of memory spaces that are isolated by hardware includes a virtualization space 802 and a Virtual Machine Monitor or a hypervisor running in space 818. A Virtual Machine 804 runs in the virtualization space 802. The Virtual Machine 804 includes one or more "runtime codes" or running processes 806A, 806B, 806C. These are typically running under the control of the guest operating system, such as those responsible for memory and/or resources management, disk management, tasks priorities, and so on. The runtime code inside the VM can be executed in user mode 814, or in kernel mode 816, and frequently, though not always, includes portions that run in one mode, and other portions that run in the other mode.

Once the Virtual Machine Monitor prepares the guest OS for execution (or provides a virtual boot up of the Guest OS which, the first time this happens, can be a fairly lengthy task), the Virtual Machine Monitor machine invokes the guest OS content, see exemplary "VM entry point" in FIG. 8. The runtime code then begins executing, starting at a particular entry point. From this point, the run time code is executed in a native mode.

A guest tool 808 is shown in the kernel mode of the guest operating system. As further shown in FIG. 8, eventually, the runtime code may reach an instruction that triggers an event that potentially requires a context switch. In this case, for example by using an appropriate interrupt handler, the control then switches to the guest tools, particularly, to the kernel acceleration routine 810, which analyzes the reasons for the guest tool being invoked, and determines whether the event can be handled inside the Virtual Machine context or mode or if it cannot be handled inside the VM and a context switch should be executed. For example, an attempt to write to memory area that is not allocated to this particular machine or can cause context switching would be something that may require VMM intervention. On the other hand, a sequence of instructions that read physical a memory areas allocated to another virtual machine's context or to the host operating system does not necessarily need to be handled by the VMM, and instead might be handled by the event handler 812. The event handler 812 might emulate the functionality of the instruction or set of instructions that invoked the guest tool 808, and/or might patch the code of the guest OS. The control then returns back to the runtime code 806.

If the guest tool determines that VMM intervention is required, it can invoke the VMM, see "VM exit" and the event handler of the VMM. In partial embodiment instructions caused the event may be handled in VMM context or mode without modification.

Figure 9:
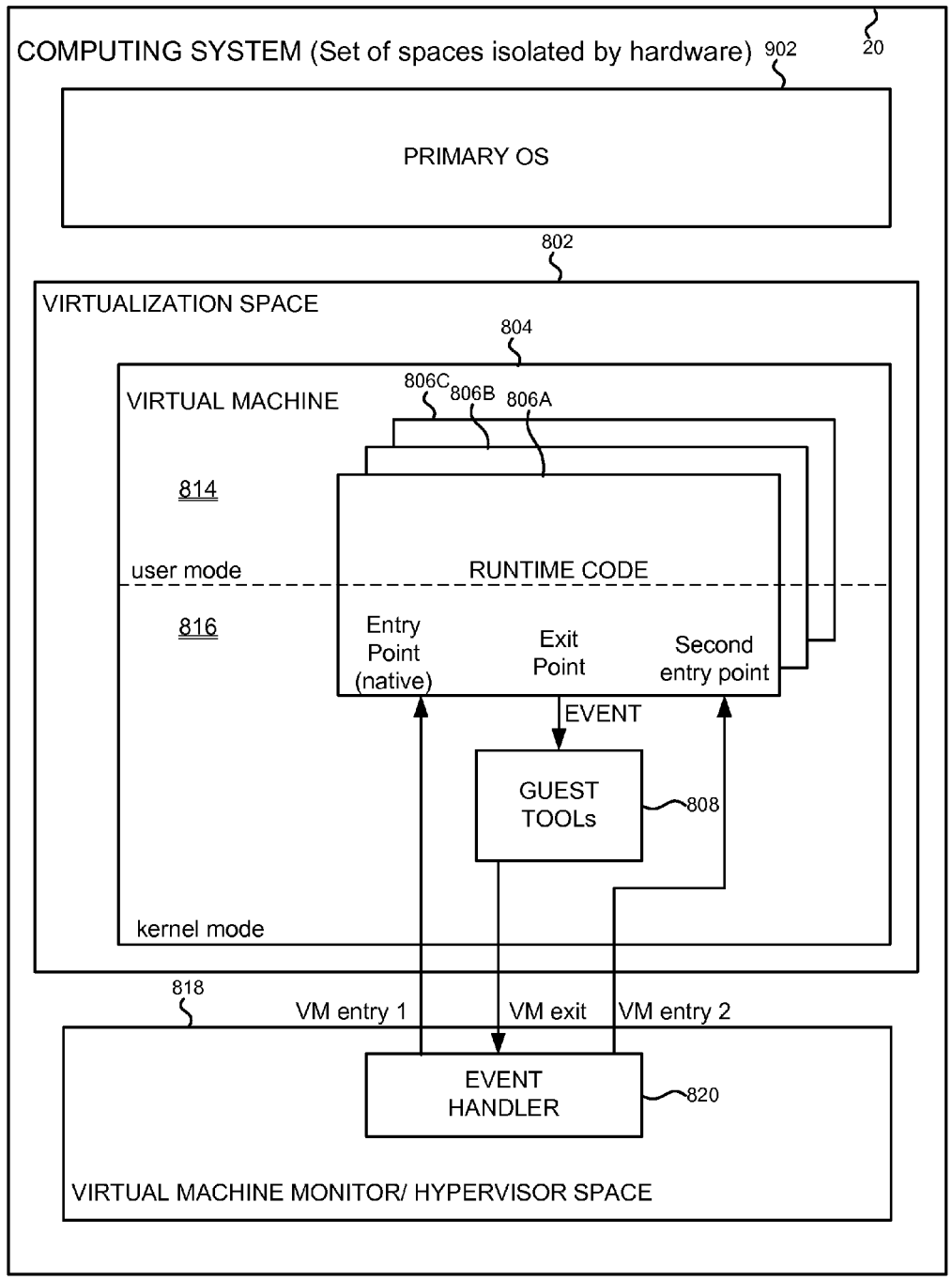

FIG. 9 illustrates a more general example of the invention. Generally, FIG. 9 is similar to FIG. 8, except for the fact that the Virtual Machine Monitor 818 is responsible for patching the code of the guest OS. Here, upon an event being triggered in the runtime code 806, guest tool 808 is invoked, and, where the guest tool 808 determines that the VMM should do the patching, it then invokes the event handler 820 in the VMM 818. The event handler 820 then will patch the guest OS code, and control will return back to the guest OS at the second entry point. As one option, the guest tool 808 can communicate information about the Guest OS to the VMM—in other words, instead of treating the VM as "black box", the VMM can apply patches that are OS-specific. Generally, the intent is to have the Guest OS run as if it were a native operating system, without patches. VT-X architecture (and similar hardware virtualization support schemes) provides this possibility by isolation at the hardware level. For example, contents of some processor registers and critical data may be saved in chipset hardware without host OS notification. On the other hand, patching can be used to avoid execution of some commands or operations following those commands that force a context switch, in order to improve performance.

Figure 10:
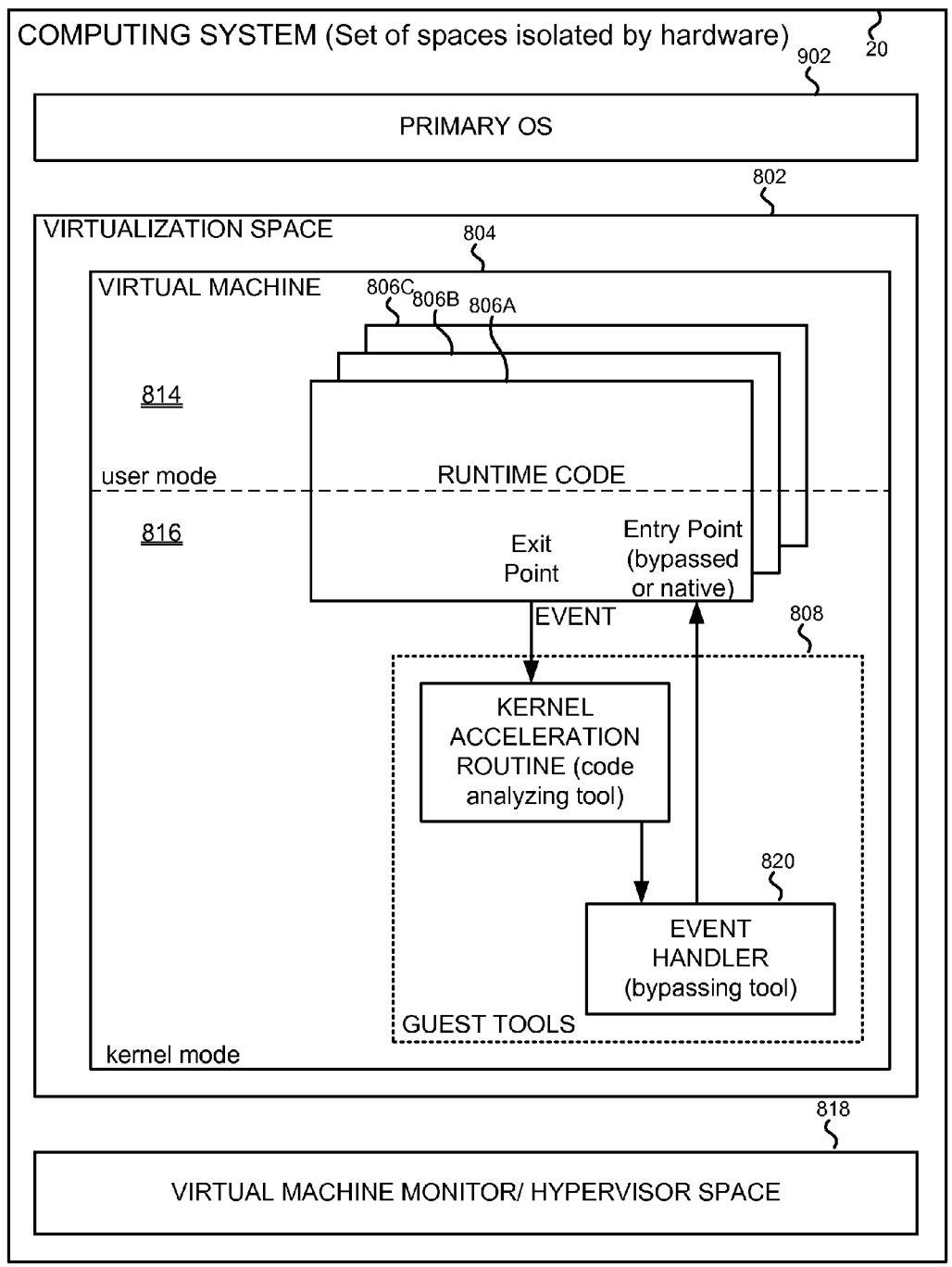

FIG. 10 illustrates a somewhat "extreme" situation, where the guest code has been fully patched everywhere, and there are virtually no context switches from the VM to the VMM. All of the events that otherwise would have triggered a context switch have now been replaced either by functionally equivalent code, for example, using stubs, using patches, etc., or events that require a context switch to the VMM are instead handled in the guest tool. Thus, the relatively clock cycle intensive task of context switching is avoided, and the guest OS code executes in either a native mode or in a mode that's substantially approximates a native mode It is similar to Xen paravirtualization technology, where for better performance, the VMM can perform functions required for functioning of the VM, even though the host operating system lacks this capability.

Figure 7:
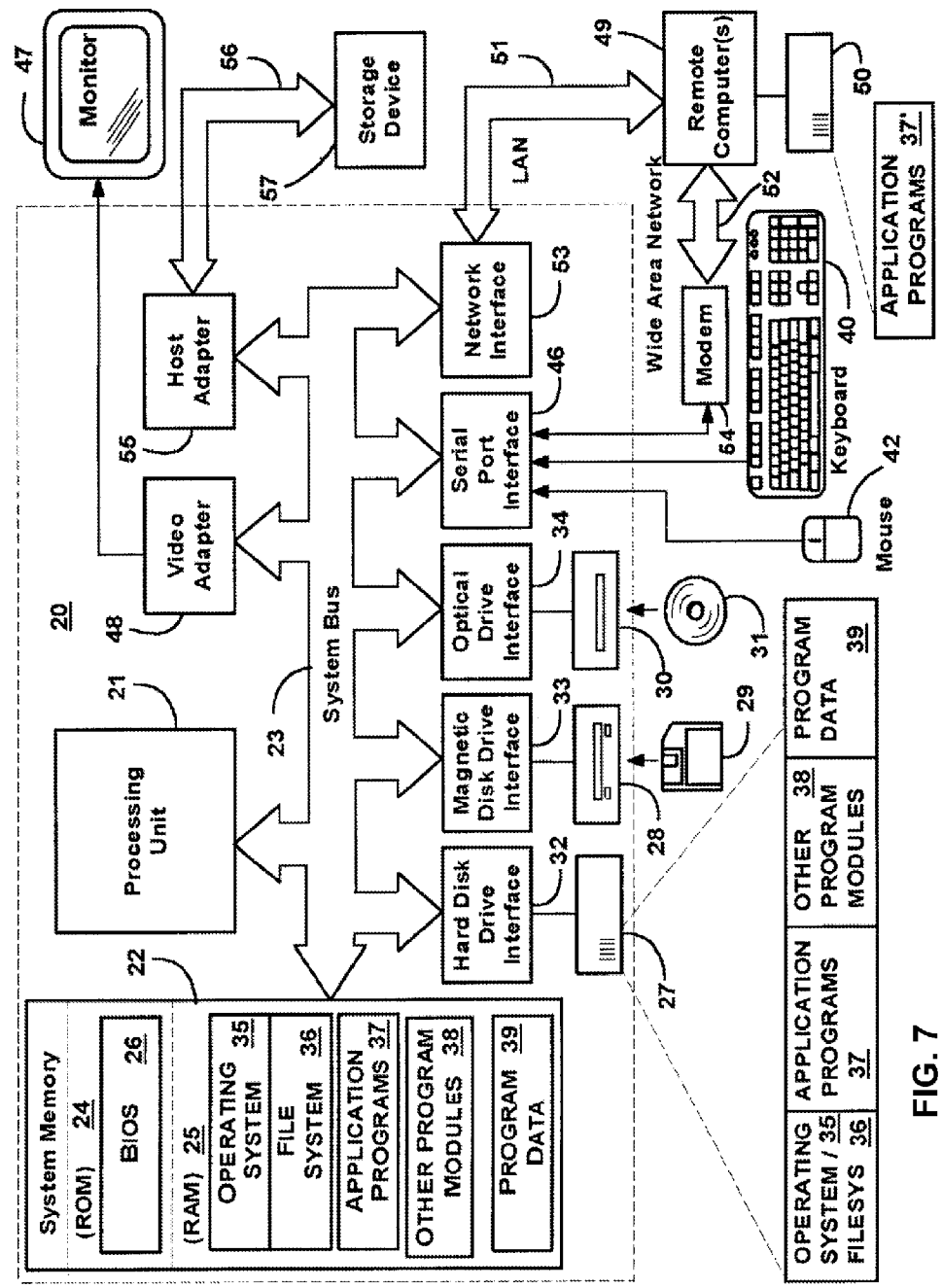
FIG. 7 illustrates an exemplary computer system on which the invention may be implemented

With reference to FIG. 7, an exemplary computer system, where the invention can be implemented, includes a general purpose computing device in the form of a user-side computer and/or server-side computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help to transfer information between elements within the computer 20, such as during start-up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 20 includes a file system 36 associated with or included within the operating system 35, such as the Windows NT™ File System (NTFS), one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for increasing efficiency of guest operating system (OS) code in a Virtual Machine (VM) running under control of a Virtual Machine Monitor VMM), wherein the guest OS code includes unsafe instructions that force a processor to exit Virtual Machine context, the method comprising:
    (a) entering a virtual machine hardware support mode of the processor;
    (b) installing a code analysis routine that analyzes opcodes of instructions in the guest OS code;
    (c) entering a VM context execution mode that fully virtualizes the processor;
    (d) at run time, detecting presence of the opcodes of unsafe instructions in the guest OS code using the code analysis routine;
    (e) executing natively, in the VM context, and without switching to the VMM, substitute instructions instead of at least some of the unsafe instructions; and
    (f) resuming the guest OS code execution, after execution of the substitute instructions,
    wherein the code analysis routine is implemented as a guest tool in a hypervisor or another virtual machine, and
    wherein the guest tool implements the guest OS code parsing and modification using information about memory mapping of a guest OS kernel.

2. The method of claim 1, wherein the code analysis routine runs in the VM context.

3. The method of claim 1, wherein the code analysis routine parses the guest OS code to identify the unsafe instructions.

4. The method of claim 3, further comprising modifying the guest OS code, wherein software debugging is used for the parsing and modification.

5. The method of claim 1, wherein:
    the code analysis routine is implemented as an exception handler; and
    exceptions are triggered when the guest OS code instruction attempts to exit the processor's virtual machine hardware support mode.

6. The method of claim 1, wherein the code analysis routine
    (a) identifies, in the guest OS code, a predetermined pattern that includes unsafe instructions; and
    (b) rolls back the effects of the unsafe instructions and any intervening instructions to ensure correct guest OS code context.

7. The method of claim 1, wherein code analysis routine runs outside the VM context and performs the following operations:
    (a) analyzes the guest OS code and detects patterns that include unsafe instructions;
    (b) replaces the unsafe instructions in the patterns with breakpoints that raise exceptions;
    (c) associates each pattern with a handler in the guest OS such that the handler:
        (i) emulates the instructions in the patterns that raise the exceptions; and
        (ii) rolls back effects of execution of any prior privileged but unsafe instruction that was executed in the VM context.

8. The method of claim 7, further comprising inserting instructions that raise exceptions into the analyzed code, in proximity to the unsafe instructions.

9. The method of claim 7, wherein the replaced instructions are emulated.

10. The method of claim 7, wherein the replaced instructions are rolled back.

11. The method of claim 7, wherein the replaced instructions are located in the guest OS code prior to the pattern.

12. A computer useable non-transitory recording medium having computer program logic stored thereon for executing on a processor, the computer program logic comprising computer code for implementing the method of claim 1.

13. A system for increasing efficiency of guest OS code in a Virtual Machine (VM) running under control of a Virtual Machine Monitor (VMM), wherein the guest OS code includes unsafe instructions that force a processor to exit Virtual Machine context, the system comprising the processor, memory coupled to the processor, and computer code loaded into the memory that performs the following steps:
    enters a virtual machine hardware support mode of the processor;
    installs a code analysis routine that analyzes opcodes of instructions in the guest OS code;
    enters a VM context execution mode that fully virtualizes the processor;
    at run time, detects presence of the opcodes of unsafe instructions in the guest OS code using the code analysis routine; and
    executes natively, in the VM context, and without switching to the VMM, substitute instructions instead of at least some of the unsafe instructions; and
    (g) resumes the guest OS code execution, after execution of the substitute instructions, wherein the code analysis routine is implemented as a guest tool driver in a hypervisor or another virtual machine, and wherein the guest tool implements the guest OS code parsing and modification using information about memory mapping of a guest OS kernel.

\* \* \* \* \*